(12) United States Patent
Tanaka

(10) Patent No.: US 7,487,324 B2
(45) Date of Patent: Feb. 3, 2009

(54) COMPUTER SYSTEM

(75) Inventor: Kazuyoshi Tanaka, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 229 days.

(21) Appl. No.: 10/969,723

(22) Filed: Oct. 20, 2004

(65) Prior Publication Data
US 2005/0257001 A1   Nov. 17, 2005

(30) Foreign Application Priority Data
May 12, 2004 (JP) ............................. 2004-142310

(51) Int. Cl.
G06F 12/00 (2006.01)
G06F 13/00 (2006.01)
G06F 13/28 (2006.01)

(52) U.S. Cl. .................. 711/173; 711/207; 711/221; 358/1.16

(58) Field of Classification Search .................. 711/173
See application file for complete search history.

(56) References Cited

U.S. PATENT DOCUMENTS

| 5,432,891 | A  | * | 7/1995  | Onodera ................. 358/1.15 |
| 5,467,202 | A  | * | 11/1995 | Washio et al. ............ 358/448 |
| 5,930,467 | A  | * | 7/1999  | Morita .................. 358/1.16 |
| 6,038,033 | A  | * | 3/2000  | Bender et al. ........... 358/1.16 |
| 6,101,576 | A  | * | 8/2000  | Kobayashi et al. ......... 711/122 |
| 6,185,575 | B1 | * | 2/2001  | Orcutt .................. 707/200 |
| 6,272,611 | B1 | * | 8/2001  | Wu ..................... 711/173 |
| 6,281,894 | B1 |   | 8/2001  | Rive |
| 6,377,500 | B1 | * | 4/2002  | Fujimoto et al. ........ 365/230.01 |
| 6,473,842 | B1 | * | 10/2002 | Tsutsumi ............... 711/159 |
| 7,076,632 | B2 | * | 7/2006  | McBrearty et al. ......... 711/202 |
| 7,286,744 | B2 |   | 10/2007 | Tada |
| 2001/0012114 | A1 | * | 8/2001 | Ozaki ................... 358/1.12 |
| 2003/0131191 | A1 | * | 7/2003 | Zhang et al. ............. 711/113 |
| 2004/0032614 | A1 | * | 2/2004 | Tanaka et al. ........... 358/1.15 |
| 2004/0047061 | A1 | * | 3/2004 | Deschamps et al. .......... 360/1 |
| 2005/0078327 | A1 | * | 4/2005 | Majewicz ................ 358/1.9 |
| 2006/0129969 | A1 | * | 6/2006 | Kuno .................... 717/100 |

FOREIGN PATENT DOCUMENTS

JP    6-131126    5/1994

(Continued)

OTHER PUBLICATIONS

Japanese Office Action (with an English translation) issued in the corresponding foreign application No. 2004-142310.

(Continued)

Primary Examiner—Kevin L Ellis
Assistant Examiner—Prasith Thammavong
(74) Attorney, Agent, or Firm—Cohen Pontani Lieberman & Pavane LLP

(57) ABSTRACT

A computer system including a first volatile memory, a nonvolatile memory being virtually divided into a plurality of areas including a first memory area and a second memory area, the first memory area including a first management table thereof, and a controller for controlling data reading and data writing of the volatile memory and the nonvolatile memory, the controller controlling the first volatile memory to store a second management table of the second memory area.

12 Claims, 7 Drawing Sheets

FOREIGN PATENT DOCUMENTS

| | | |
|---|---|---|
| JP | 10-32690 | 2/1998 |
| JP | 2002-29101 | 1/2002 |
| JP | 2002-184103 | 6/2002 |
| JP | 2002-314921 | 10/2002 |
| JP | 2004-079102 | 3/2004 |

OTHER PUBLICATIONS

Japanese Office Action (with an English translation) issued in the corresponding foreign application No. 2004 142310.

* cited by examiner

111

| IMAGE ID | START CLUSTER | END CLUSTER | SIZE | used |
|---|---|---|---|---|
| 001 | 0000 | 0004 | 5 | Yes |
| - | - | - | 10 | No |
| 030 | 0015 | 0019 | 5 | Yes |
| 041 | 0020 | 0023 | 4 | Yes |

112

| JOB ID | IMAGE ID | RAW/MEMORY | START CLUSTER/ ADDRESS |
|---|---|---|---|
| 0001 | 020 | MEMORY | 3456 |
| 0001 | 021 | RAW | 5555 |
| 0002 | 022 | RAW | 4000 |
| 0002 | 023 | RAW | 2000 |
| 0002 | 024 | RAW | 1000 |

COMPUTER SYSTEM

CROSS-REFERENCE TO RELATED APPLICATION

The present application is based on Japanese Patent Application No. 2004-142310 filed with Japan Patent Office on May 12, 2004, entire content of which is hereby incorporated by reference.

FIELD OF THE INVENTION

The present invention relates to a computer system having a nonvolatile memory. In particular, the present invention pertains to a computer system that reads and/or writes image data from and/or into the nonvolatile memory.

BACKGROUND OF THE INVENTION

In recent years, hard disks (HDD: Hard Disk Drive) have been installed in image forming devices such as digital copiers, printers and the like as a non-volatile storing device for storing large volumes of image data. In these types of image forming devices, the hard disk may be used for the purpose of storing image data from an original document so that it can be subsequently searched for and reused, or it may be used for supplementing insufficient volatile memory capacity by temporarily storing image data from an original document by page with a prescribed timing, to an image output device.

When the hard disk is used for the former purpose, the image data which is written on the hard disk is managed by a file managing system such as FAT (File Allocation Table) and the like, and the image data can be subsequently searched for and read by the user specifying image data which is to be subsequently reused and the file name thereof.

When the hard disk is used for the latter purpose, since it is necessary to ensure writing and reading speed for the image data, the data reading and writing are usually performed by a managing system which is different from the abovementioned file managing system such as the FAT and the like.

For example in Japanese Patent Publication No. 2002-029101(A), technology is disclosed in which a plurality of continuous fixed unit recording regions of a fixed size obtained by recording one page of compressed image data for the original document as one data item, are set on a hard disk, and compressed image data for one page of a document is written in the unit recording region on the disk.

Japanese Patent Publication No. H06-131126(A) discloses an image processing apparatus in which the image data is separated and stored in zones (external zones and internal zones) on the hard disk with different processing speeds, and it is thus possible to perform a prescribed operation without reducing processing speed.

Japanese Patent Publication No. H10-032690(A) discloses technology in which the an image processing apparatus comprises a plurality of hard disks, and when one hard disk capacity reaches its limit, storing is done in the empty region of another hard disk.

As described above, since writing and reading of data in hard disks is performed by different managing systems according to purpose for its use, in the prior art, in order to use the hard disk for two purposes, it was necessary to install two hard disks, and there was a cost problem.

SUMMARY OF THE INVENTION

An object of the present invention is to provide a novel computer system that can exploit non-volatile storing device efficiently. Another object of the present invention is to make it possible to use one non-volatile storing device for different purposes, and to achieve an efficient use of the non-volatile recording device.

To achieve at least one of the above mentioned objects, a computer system reflecting a first aspect of the present invention includes a first volatile memory, a nonvolatile memory being virtually divided into a plurality of areas including a first memory area and a second memory area, the first memory area including a first management table thereof, and a controller for controlling data reading and data writing of the volatile memory and the nonvolatile memory, the controller controlling the first volatile memory to store a second management table of the second memory area.

According to a computer system reflecting a second aspect of the present invention includes a volatile memory, a nonvolatile memory virtually divided into a plurality of areas including a first memory area and a second memory area, the first memory area having a file management table, and a controller for writing data to the volatile memory and the nonvolatile memory, the controller writing the data to the first memory area in accordance with the file management table in a case where the data is to be reusably stored in the nonvolatile memory, and the controller writing the data to the second memory area in accordance with a management table stored in the volatile memory in a case where the data is to be temporally stored in the second memory area.

According to a computer system reflecting a third aspect of the present invention includes a nonvolatile memory which has a memory medium virtually divided into a plurality of areas including a first memory area and a second memory area which is farther to an rotation center of the memory medium than the first memory area, and a controller for controlling reading and writing operations of the nonvolatile memory, the controller controlling the first memory area with a first management system and the second memory area with a second management system, the second management system being more suitable for processes that require high speed reading and writing controls than the first management system.

According to a computer system reflecting fourth aspect of the present invention includes a nonvolatile memory which is virtually divided into a plurality of areas including a first memory area and a second memory area, the first memory area including a first management table thereof, and a controller for writing data to the nonvolatile memory, the controller writing a set of data to the first memory area in accordance with the file management table, and the controller writing a set of data to continuous area of the second management area.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE INVENTION

Hereinafter, typical embodiments of the present invention will be described with reference to drawings. It should be note that the present invention is not limited to the embodiments described below. Definitions of terms described below are given by way of explanation of the terms only, and thus the definitions of the terms of the inventions are not limited thereto.

Figure 1:
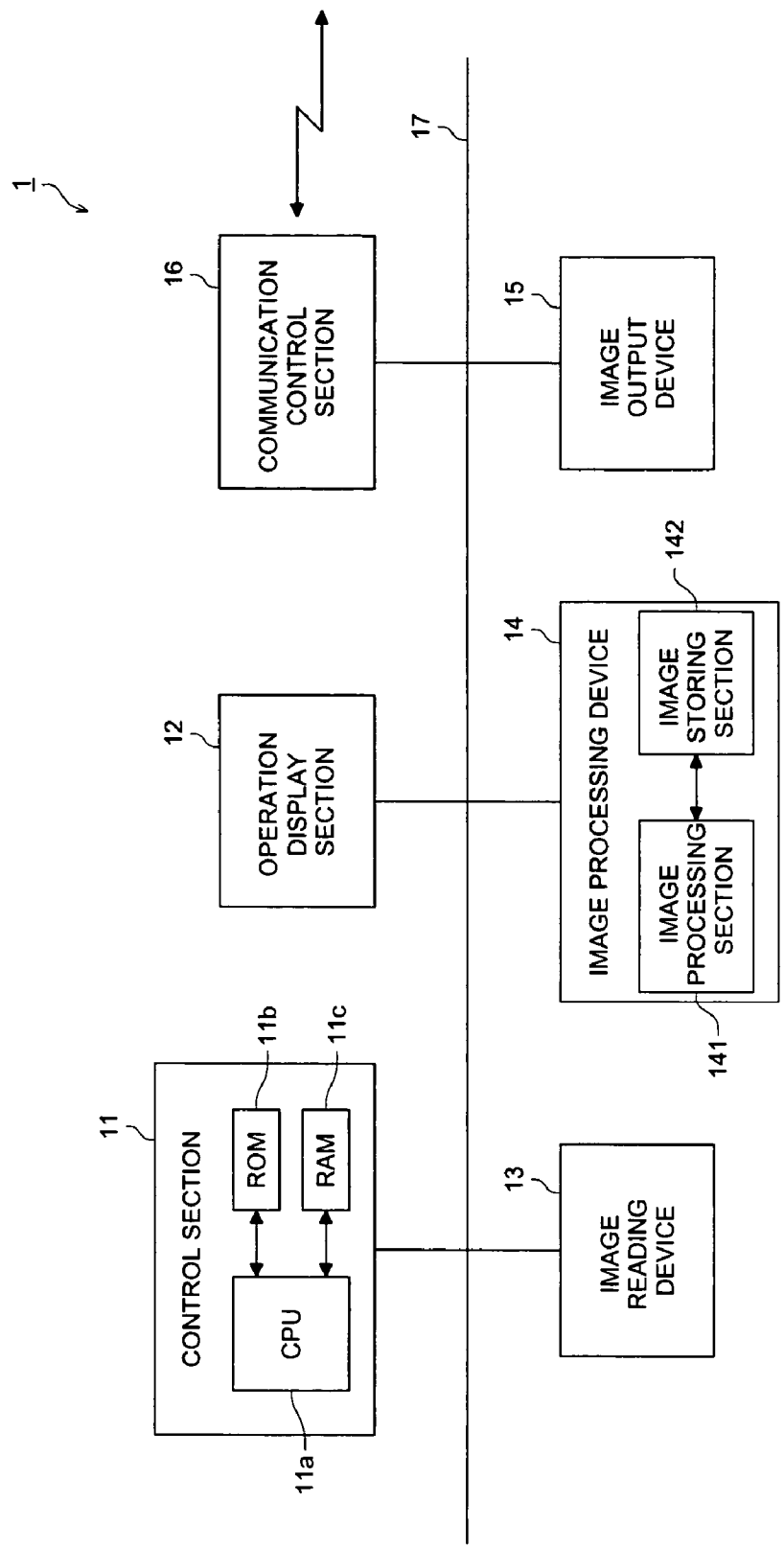
FIG. 1 is a block diagram showing the functional configuration of image processing device using the computer system of the present invention.

FIG. 1 shows an example of the functional configuration of an image forming device employing the computer system of the present invention. FIG. 1 is an electro-photographic black and white copier, comprises control section 11, operation display section 12, image reading device 13, image processing device 14, and image output device 15, communication control section 16 and the like and the sections and the devices are connected by bus 17.

Control section 11 comprises CPU (Central Processing Unit) 11*a*, ROM (Read Only Memory) 11*b*, RAM (Random Access Memory) 11*c* and the like. CPU 11*a* of control section 11 reads system programs and various processing programs stored in ROM 11*b* due to operation of operation display section 12 and extracts them in the RAM 11*c*, and the operation of each section of image processing device 1 is centrally controlled in accordance with the extracted program. In addition, the CPU 11*a* executes various processes including a process for temporarily storing image data and processes for transferring and deleting image data, which will be described hereinafter.

Operation display section 12 comprises a LCD (Liquid Crystal Display) and the like, and displays various operation buttons, device statuses, operation status of the functions and the like on the display screen, in accordance with display signal command inputted from control section 11. In addition, a LCD screen comprises a pressure sensitive (resistance film pressure type) touch panel in which transparent electrodes are disposed in a grid pattern, and the X-Y coordinate of the input point pressed with a finger or a touch pen is detected by a voltage value(s), and a detected positional signal is output to control section 11 as an operational signal. It is to be noted that the touch panel is not limited to a pressure sensitive type and may be other types such an electrostatic type or an optical type. Furthermore, operation display panel 12 comprises various types of operation buttons such as number buttons (ten keys), a start button and the like, and operational signals are outputted to control section 11 by operating these buttons. In this configuration, operation display section 12 has an input screen so that the user can specify a name for a job and an image data for the job when a user wishes to save image data to be used in a job on HDD 14*e* such that the image data is reusable, and an input command from the input screen are output to control section 11. Job herein, refers to a series of operations pertaining to an image forming job for printing and the like. For example, in the case of copying a plurality of documents, the series of operations for copying the documents on a plurality of sheets is one job.

Image reading device 13 has a scanner under a contact-glass on which the document is loaded, and the document is read thereby. The scanner may comprise a light source, a CCD (Charge Coupled Device) line sensor and the like. The light irradiated from the light source to the document is scanned on the document, and the scanned light is reflected and focused on the line sensor. The line sensor photo-electrically converts the scanned and reflected light, and thus the image on the document is read. The image which has been read is then converted to digital image data by an A/D converter and then outputted to image processing device 14. Image herein, is not limited to image data for diagrams and photographs and the like, but also includes text data such as letters and symbols.

Image processing device 14 comprises an image processing section 141 and image storage section 142. In the image processing device 14, image data inputted from image reading device 13 is subjected to image processing such as space filter processing, enlargement/reduction processing, rotation processing, gradation correction processing and the like. The image data is temporarily stored in image storage section 142, and then outputted at a prescribed timing to image output device 15. The printer code being inputted from communication control section 16 is converted to image data and temporarily stored in image storage section 142, and then outputted at a prescribed timing to image output device 15.

Figure 2:
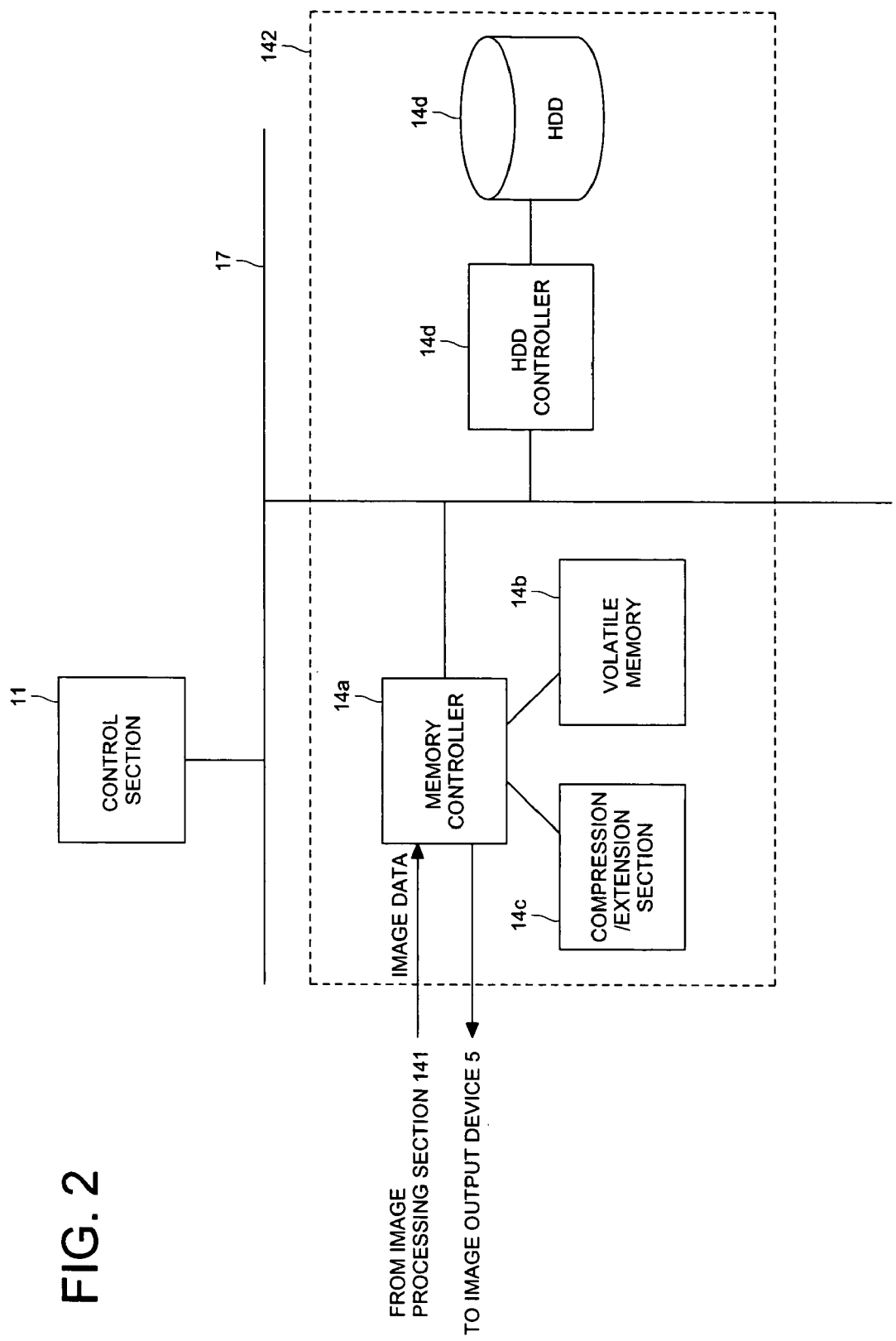
FIG. 2 is a block diagram showing an example of the configuration of image storing section 142.

FIG. 2 is an example of the configuration of image storage section 142. As shown in FIG. 2, image storage section 142 comprises memory controller 14*a*, volatile memory 14*b*, compression/extension section 14*c*, HDD controller 14*d*, and HDD 14*e*.

Memory controller 14*a* writes image data inputted from image processing section 141 into volatile memory 14*b* and reads image data from volatile memory 14*b* based on control from control section 11. That is to say, memory controller 14*a* compresses the image data inputted from image processing section 141 using compression/extension section 14*c*, and also writes and temporarily stores image data into volatile memory 14*b*, based on control from control section 11. Further, when there is a command for image data output from control section 11, memory controller 14*a* decompresses the image data recorded in volatile memory 14*b* for which an output command was given using compression/extension section 14*c*, and outputs the image data to image output device 15.

Volatile memory 14*b* comprises a volatile storage device such as a DRAM (Dynamic Random Access Memory). Volatile memory 14*b* temporarily stores image data compressed by compression/extension section 14*c* being inputted from image processing section 141. Compression/extension section 14*c* is an IC which performs image data compression/extension processing.

HDD controller 14*d* writes image data on HDD 14*e* based on control from control section 11, and reads and erases image data from HDD 14*e*. Also HDD controller 14*d* has installed therein, DMA (Direct Memory Access) controller, and controls transferring of image data between HDD 14*e* and volatile memory 14*b*.

Figure 3:
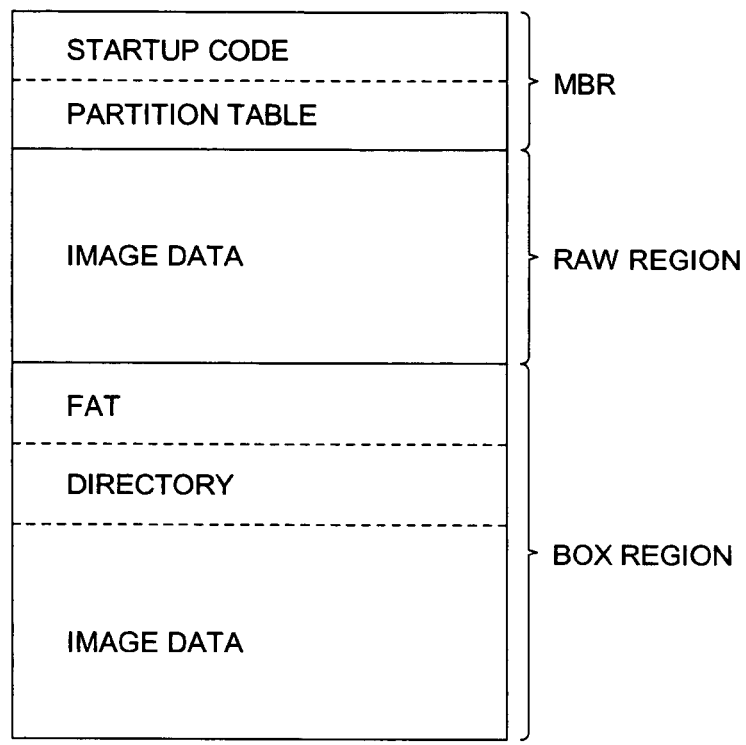
FIG. 3 is a pattern diagram showing the recording area structure of HDD 14*e*.

HDD 14*e* is a non-volatile storage device for storing image data. As shown in FIG. 3, the MBR (Master Boot Record) is recorded at the top of the non-volatile storage device and it has two (2) partitions (storage regions) which are so called a RAW region or area and a BOX region or area. It is to be noted that HDD 14*e* manages data in cluster units of a plurality of continuous sectors.

Figure 4:
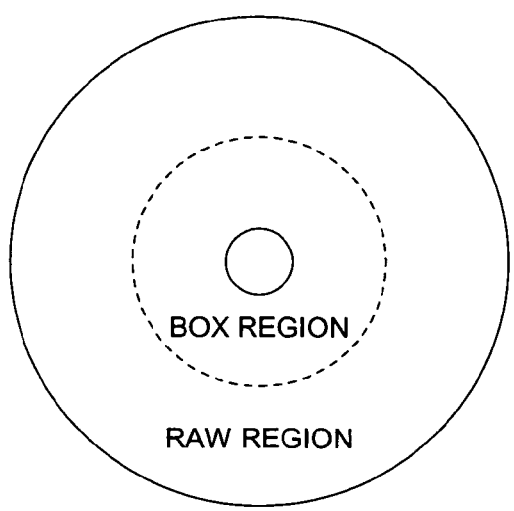
FIG. 4 is a pattern diagram of the HDD 14*e* viewed from above.

MBR is recorded at the top sector of HDD 14*e* and comprises a start code, a partition table and the like. The partition table is a table for logically dividing HDD 14*e* into a plurality of partitions (storage regions) and records the partition positions and sizes, partition types and the like. In this embodiment, HDD 14*e* is divided into two regions according to the partition table as shown in FIG. 4, such that 10 GB located in the outer portion of a disk is allocated for RAW region and 30 GB located in the inner portion of the disk is allocated as a BOX region (described in detail hereinafter). Since the disk of HDD 14*e* rotates at a fixed speed and the length of the outer and inner circumferences are different, the access speed (the speed with which the data can be outputted and inputted in a fixed time) for the outer portion is faster than that of the inner portion.

RAW region is a region for temporarily storing image data being subjected to image processing at image processing section 141 to output the image data to output device 5 at a prescribed timing, and is a virtual memory for supplementing the insufficient capacity of volatile memory 14*b*. The RAW region requires speed for data writing and data reading. In practice, it is preferable that a time period for storing image data of plural pages of a document into the RAW region is shorter than that for reading plural pages of a document being arranged in continuous. And also, a time period for reading image data of plural pages for a document from the RAW region is preferably shorter than that for printing the same image data. As a result, the RAW region is assigned to the outer periphery of HDD 14*e*. Also, the RAW region is subjected to direct data control of control section 11, and one page of image data is written in continuous clusters.

RAW region data control in the control section 11*b* is described in the following.

CPU 11*a* in control section 11 executes software processing with the assistance of programs stored in the ROM 11*b* to create RAW region management table 111 in RAM 11*c*, to manage data storage statuses in RAW region of HDD 14*e* and to control writing and reading of image data in the RAW region under the control of RAW region management table 111 thereby. Also the CPU 11*a* executes software processing with the assistance of programs stored in ROM 11*b* to create a job managing table 112 in the RAM 11*c* to link the image data being managed by the RAW region management table 111 with a job.

Figures 5, 6, 7:
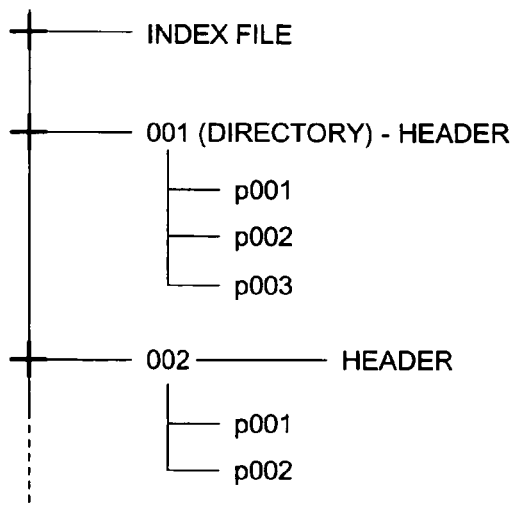
FIG. 5 shows an example of data storage in RAW region management table 111.
FIG. 6 shows an example of data storage in job managing table 112.
FIG. 7 shows an example of the directory structure for managing the BOX region of the HDD 14*e*.

FIG. 5 is an example of RAW region management table 111. As shown in FIG. 5, RAW region management table 111 comprises an image ID region for storing image ID (for example, 001, 030, 041, etc.) for identifying the image data, a start cluster region for storing a start cluster number of the continuous region in which the image data is stored, an end cluster region for storing the end cluster number of the continuous region, a size region for storing data (for example, 5, 10, 5, etc) which indicates the size (number of clusters) of the continuous region and a used region for storing data indicating whether the continuous region is being used (for example, yes, no). It is to be noted that the control section 11 manages the data in the volatile memory 14*b* using a table similar to the volatile memory management table 113 (not shown) as the above RAW region management table 111. However, for the volatile memory 14*b*, the continuous regions are managed by addresses (start address and end address). Also, data indicating the capacity of the continuous region are stored in the size region. FIG. 6 shows an example of job management table 112. As shown in FIG. 6, job managing table 112 comprises a job ID region for storing job ID (for example 0001, 0002, etc.) for identifying a job, an image ID region for storing image ID (for example 020, 021, 022, etc.) for identifying image data stored for the job, a RAW/memory region for storing data (for example memory, RAW, etc.) indicating whether the image data is stored in volatile memory 14*b* or in RAW region of HDD 14*e*; and data (for example 456, 5555, 4000, etc.) indicating the start cluster or the start address where the image data is stored. It is to be noted that the image ID in RAW region management table 111 corresponding to image data and the image ID in job managing table 112 corresponding to the same image data are the same.

When CPU 11*a* in control section 11 writes image data in RAW region, it refers to RAW region management table 111, and if the region is not being used, and also if there is a continuous region that is greater in size than the image data that is to be written, that continuous region is determined to be the region for image writing. In the case where there is no continuous region that is not being used and is greater in size than the image data that is to be written, the continuous region being next to the last cluster being used is determined to be the region into which the image data is to be written and RAW region management table 111 is rewritten. Furthermore, when image data is to be erased from RAW region, CPU 11*a* changes the data in USED region of RAW region management table 111 corresponding to the image data to be erased into "No". Then it becomes possible to use the region in which the data to be erased is stored. Also meaningless data may be written in the region to be erased in a RAW region.

As described above, in this embodiment, since RAW region management table 111 is stored in the RAM 11*c*, it may be speedily accessed by the CPU 11*a*. However, when the power supply is cut off, the data stored in the RAW region is not secured.

Meanwhile, in this embodiment, the BOX region of HDD 14*e* is a region for storing image data for which instructions to save so as to be reusable when it is searched for were given by a user via operation display section 12. The writing and reading speed of the data is not so important, but file management is necessary so that prescribed image data can be reused even if the power supply is cut off. Thus as shown in FIG. 3, FAT (File Allocation Tables) and the like are for file management of the image data in the BOX region and a file managing system for the directory structure and the like are stored in the BOX region.

FIG. 7 is an example of the directory structure. One directory corresponds to one job. In FIG. 7, directory numbers for identifying the directory (for example 001 and 002) and information corresponding to the names (names specified by the user via the operation display section 12) of the jobs to be managed by the directory are stored by an index file. The header in the directories has necessary information for outputting the job corresponding to the directory (such as whether a single side-sided or dual sided paper, paper size and the like) and also stores image data for one page of a corresponding job as one file (for example image files p001-p003 in directory 001). FAT manages clusters that store data for the image files, and also store-information and the like which indicates linking (a chain structure) of the data which has been divided into a plurality of clusters and stored. In this case, since speed is not necessary, one page of image data may exist in physically separated regions (and linked by the chain structure).

CPU 11*a* of control section 11 executes a software process with assistance from programs stored in ROM 11*b* to thereby manage image files stored in the BOX region based on the file managing system of FAT and a directory structure, and writing and reading of the image data is controlled thereby. By storing a file managing system in HDD 14*e*, even if the power supply is once cut off, image data for each job and information for outputting the jobs can be searched for and the image data can be reused.

Image output device 15 in FIG. 1 comprises a pulse width modulator, a laser light source, a photoreceptor drum, a charger, a developing device, a paper feeding section, a paper discharge section, a fixing device and the like. Image data inputted from image processing device 14 is subjected to pulse width modulation by the pulse width modulator and emitted as a laser light. The laser light is irradiated on the surface of a photoreceptor drum which has been charged by a charger to thereby form an electrostatic image. Image output device 15 transports a printing paper sheet whose size and orientation is set by commands inputted from operation display section 12. Toner is applied by a developing device to a region including an electrostatic latent image on the surface of the photoreceptor drum. Toner is transferred onto the transported printing paper sheet from the photoreceptor drum, and then is fixed on the printing paper sheet by the fixing device. After the fixation, the printing paper sheet is discharged from a paper discharge section.

Communications control section 16 is an interface capable being connected to a communication medium which is connected to a LAN (Local Area Network), a WAN (Wide Area Network) or the like. Communications control section 16 may comprise a communication control card such as a LAN card and may send and receive control signals and various data including a printer code between external devices such as a printer controller which is connected to a communication network via communication circuits such as a LAN cable and the like.

The operation of this embodiment will be described below.

Figure 8:
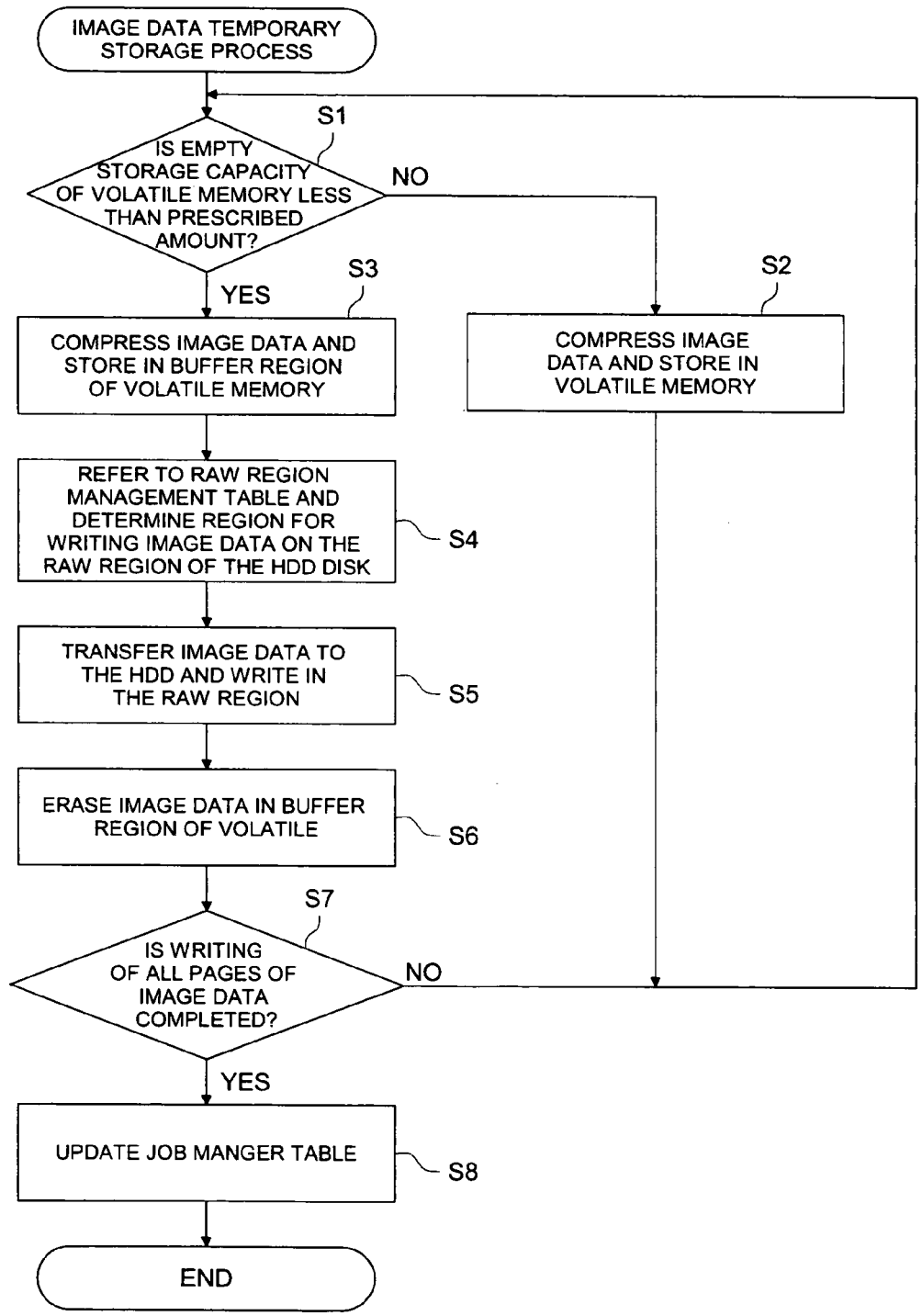
FIG. 8 is a flowchart showing the temporary storage process of the image data that is performed by the control section 11.

Firstly, the writing of image data into the RAW region of HDD 14e will be described. FIG. 8 is a flow chart showing image data temporary storage process performed by control section 11 when image data for one job having been subjected to image processing at image processing section 141 is written in image storage section 142. The process is conducted by a software process being jointly performed by CPU 11a and a program stored in ROM 11b.

At first, a judgment is made as to whether the capacity of empty space of volatile memory 14b is less than a prescribed amount (Step S1). The prescribed amount is a capacity needed for temporarily storing image data written on HDD 14e and image data read from HDD 14e for using the empty space as a buffer region, and is an amount which can store at least one page of image data. When the judgment is made that the empty space capacity of the volatile memory 14b is equal to or greater than the prescribed value by referring to volatile memory management table 113 (No in Step S1), one page of image data is compressed at the compression/extension section 14c via memory controller 14a, and the compressed data is written in volatile memory 14b, and volatile memory management table 113 is rewritten (Step S2).

When the judgment is made that the empty space capacity of volatile memory 14b is less than the prescribed value by referring to volatile memory management table 113 (Yes in Step S1), one page of image data is compressed at compression/extension section 14c under the control of memory controller 14a, and the compressed data is stored in a buffer region of volatile memory 14b (Step S3). Next, a region in HDD 14e to which the image data written is determined by referring to RAW region management table 111, and RAW region management table 111 is updated (Step S4). Specifically, RAW region management table 111 is referred to, and when there is a region that is not being used (a USED region in FIG. 5 is "No"), and there is a continuous space whose size is equal to or larger than that of the image data that is to be written, the continuous space is determined to be the region for writing of the image data, and RAW region management table 111 is updated. RAW region management table 111 is referred to, and when there is no region that is not being used (USED region in FIG. 5 is "No") is a continuous space whose size is equal to or larger than that of the image data that is to be written, the continuous region next to the last cluster that is being used is determined to be the region for writing of the image data, and this information is added to RAW region management table 111.

When a region in HDD 14e to which image data corresponding to one page is to be written is determined, the image data stored in the buffer region of volatile memory 14b is transferred to HDD 14e, and the image data is written in the region of the RAW region that was determined in Step S4 by HDD controller 14d (Step S5). The transfer of image data herein is conducted directly between volatile memory 14b and HDD 14e by DMA controller which is installed in HDD controller 14d without participation of CPU 11a, and this is preferably performed with high speed.

Once image data is transferred, the image data stored in the buffer region of volatile memory 14b is erased (Step S6). Steps S1-S7 are carried out repeatedly until writing of image data of all the pages of the job is completed. And when writing for all the pages is completed (Yes in Step S7), job managing table 112 shown in FIG. 6 is updated and the process is completed.

As described above, when an empty space capacity in volatile memory 14b becomes low and reaches to the capacity to which the image data cannot be written, the image data in the volatile memory 14b is transferred to RAW region of HDD 14e and written into continuous clusters. Accordingly, it becomes possible to speedily access to image data when reading out the image data. Furthermore, since RAW region management table 111 for managing HDD 14e is stationed in RAM 11c rather than HDD 14e and there is no need to access HDD 14e, the speed with which the image data is written is not decreased.

Figure 9:
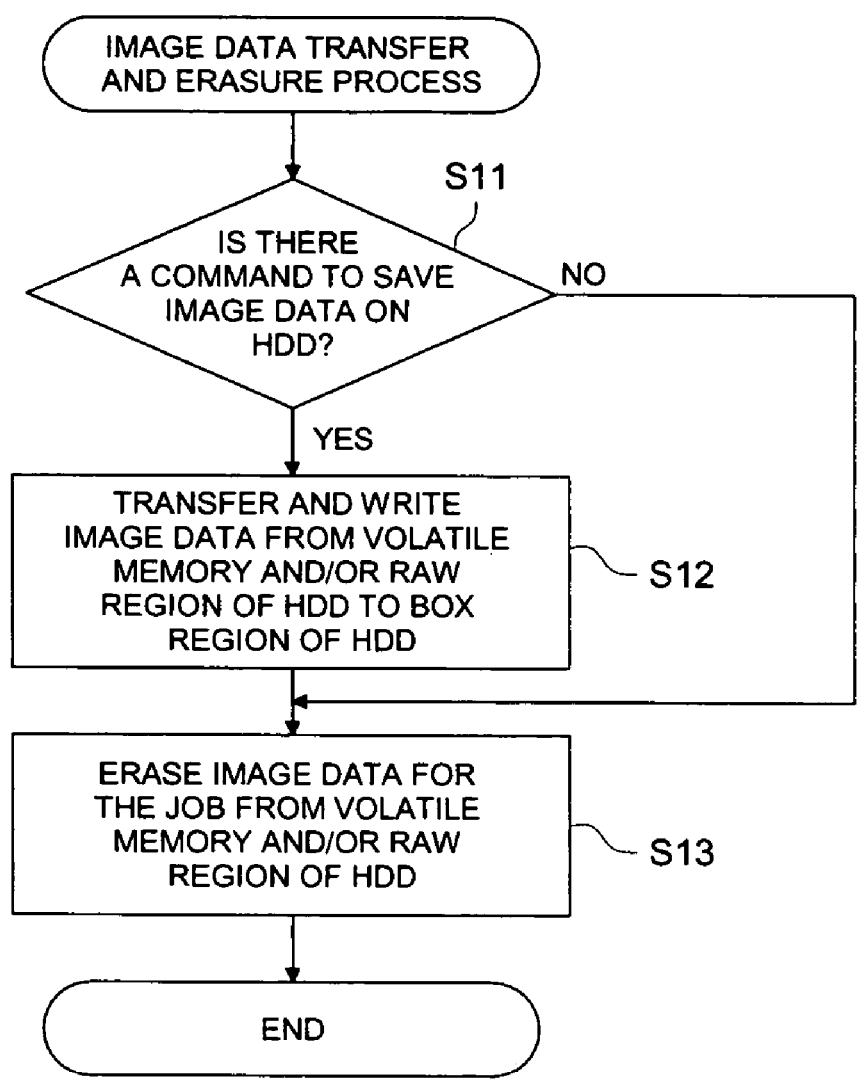
FIG. 9 is a flowchart for the image data transferring and deleting process performed by control section 11.

Next, image data writing in the BOX region of HDD 14e will be described. FIG. 9 is a flowchart showing an image data transfer and an erasing process performed by control section 11 when the job is completed. The process is conducted by a software process being jointly performed by CPU 11a and a program stored in ROM 11b.

Firstly, when a job is completed, a judgment is made as to whether a command was given by operation display section 12 for image data to be saved on HDD 14e (Step S11). When this is a job for which this command was given (Yes in Step 11), the image data corresponding to the job is read from volatile memory 14b and/or RAW region of HDD 14e and transferred to BOX region of HDD 14e, and then written in an empty region (Step S12). In particular, job managing table 112, RAW region management table 111 and volatile memory management table 113 are referred to, and the image data corresponding to the job is read from volatile memory 14b and/or RAW region of HDD 14e and then transferred. Writing of the image data in BOX region is performed based on a file management system such as FAT, a directory structure (see FIG. 7) or the like. A name inputted from operation display section 12 and the job are linked, and image data for one job is linked to one directory. Also image data is written in an empty region based on the FAT. By moving image data stored in RAW region directly to BOX region of HDD 14e without going via the buffer region of volatile memory 14b, data can be transferred easily.

Once the image data is transferred to BOX region, the image data of the job is erased from volatile memory 14b and/or RAW region (Step S13) and the process ends. In Step S11, when a judgment is made that no command has been given to the job to store the corresponding image data in HDD 14e by operation display section 12 ("No" in Step S11), Step 12 is not performed, and the image data for the job is erased from volatile memory 14b and/or RAW region (Step S13), and the process ends.

As described above, image data stored in volatile memory 14b and/or RAW region of HDD 14e is transferred and written in BOX region of HDD 14e based on a command from operation display section 12. The written image data is controlled by a general file management system such a FAT or a directory structure. As a result, it becomes possible to search for and reuse needed image data. Also the cross-use of image data becomes possible when HDD 14e is connected to an external device such as a PC (Personal Computer).

It is to be noted that data writing/reading in RAW region and data writing/reading in BOX region may be performed in parallel like a multi-task. However, in this embodiment, since there are much time-constraints on writing/reading of data in RAW region, when writing/reading in RAW region is performed, it is preferable that restrictions are made so that data writing/reading in BOX region is prohibited or so that the priority of writing/reading in BOX region is lower. For example, programs running on CPU 11a may set the priority of writing/reading in RAW region higher than that of writing/reading in BOX region. For example, the priority of writing/reading in RAW region in prescribed programs being executed by CPU 11a may be set higher than that of writing/reading in BOX region.

As described above, in image processing device 1, HDD 14e is logically divided into at least two regions and the outer periphery of the disk in HDD 14e is assigned to the RAW region, while the inner periphery is assigned to BOX region. When an empty space capacity in volatile memory 14b is less than a prescribed amount, image data is transferred to RAW region of HDD 14e, and written in continuous clusters in RAW region. When a user gives instructions for image data of a job to be saved, after the job ends, the image data is read from volatile memory 14b or RAW region and then transferred to BOX region and written therein. In BOX region, the image data is managed by file a management system such as a FAT, a directory structure or the like.

As a result, one HDD 14e can be used for the different purposes of storing image data such that the image data is reusable and of temporarily storing image data at a high speed as an extension of volatile memory 14b, and thus HDD 14e can be used efficiently.

In addition, reading and writing of data from other external devices in BOX region is possible when other external devices are connected, by managing the devices using a general purpose file managing system.

It is to be noted that the description of the above embodiment is a preferable example of the image forming device of the present invention, and the present invention is not to be limited thereby.

Figure 10:
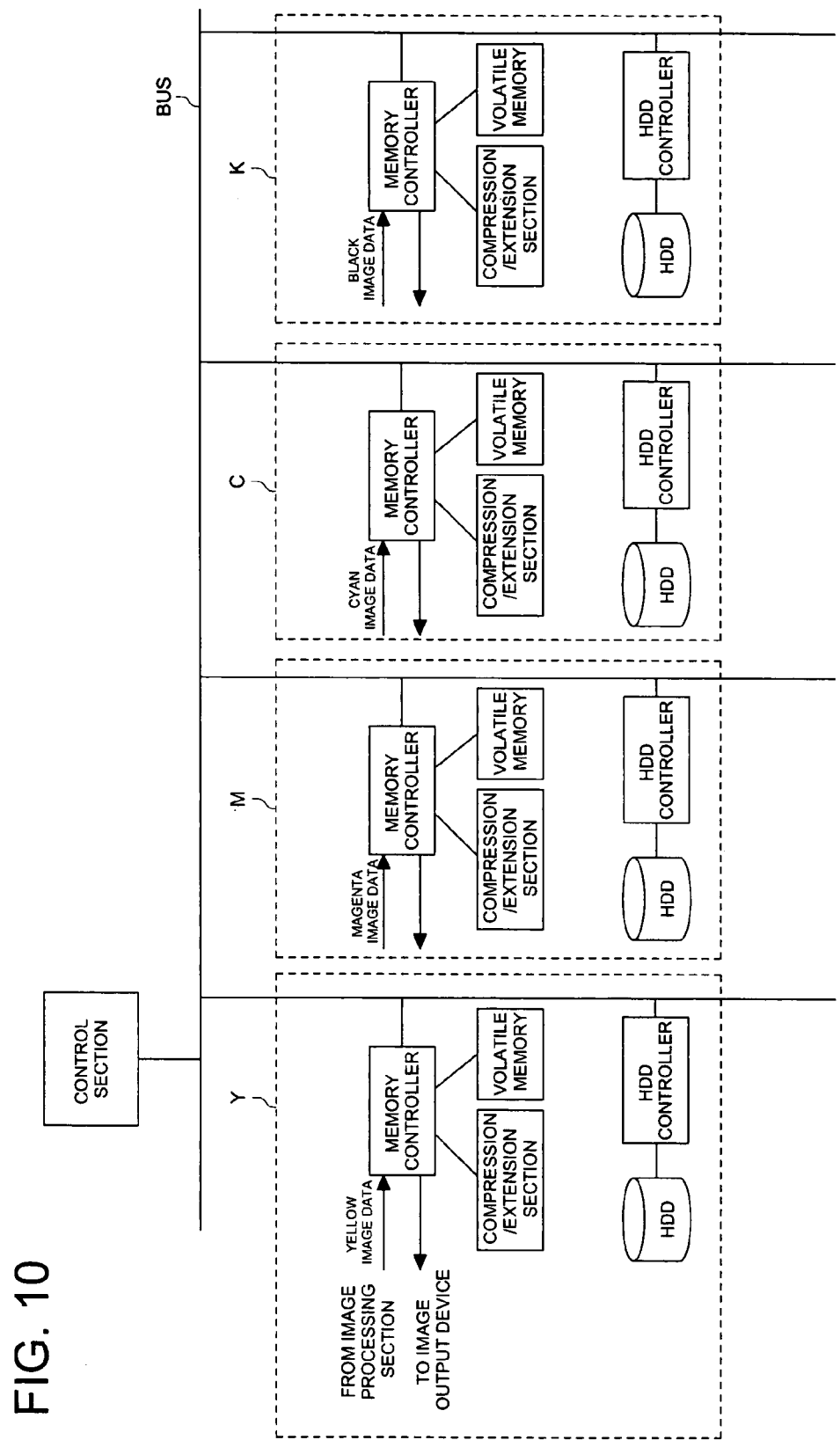
FIG. 10 is a block diagram showing an example of the configuration of the image storage section when the present invention is applied to a color-image forming device.

For example, in the above-described embodiment, image processing device 1 is a black and white copier, but the present invention may also be applied to a color image forming device. In this case, RED data, GREE data and BLUE data inputted from an image forming section are subjected to color conversion, and four kinds of data which are YELLOW data, MAGENTA data, CYAN data and BLACK data are inputted in the image storage section, and thus as shown in FIG. 10, it is preferable that image storage sections Y, M, C and K are provided for each color, and image data writing and reading is performed independently for each. As a result, there is one image storing section and processing can be performed at a higher speed than when YELLOW data, MAGENTA data, CYAN data and BLACK data are processed sequentially.

Furthermore, in the above-described embodiment, FAT and a directory structure are used for the file management of BOX region, but the file management technique for managing data so as to be searchable and reusable is not limited to them.

Further to this, the data to be managed may be sound data and other types of data. Also, in the above embodiment, a HDD is used as a non-volatile memory, however the present invention may be applied to other types of magnetic disks and optical disks.

And, a HDD can be used as a non-volatile memory even though the HDD contains a plurality of disks therein as long as at least one of the disks is logically divided. These disks are logically controlled per LBA (Logical Block Address) based on the series of a logical block having an address. And it can be easily attained so as to define an outer portion of a disk as a RAW region in any disk, since a logical block having a smaller address number is placed in the outer portion of the disk.

Also, the details of the structure and the operation of devices which configures image forming device 1 may be suitably modified without departing from the scope of the present invention.

What is claimed is:

1. A computer system comprising:
a first volatile memory configured for storing image data;
a nonvolatile memory which is virtually divided into a plurality of areas including a first memory area configured for storing reusable image data and a second memory area configured as an extension of the first volatile memory for temporarily storing image data, the first memory area including a first management table thereof; and
a controller configured for controlling data reading from and data writing to the first volatile memory and the nonvolatile memory;
a printer section configured for printing image data of a plurality of documents on recording media,
wherein the image data temporarily stored in the second memory area and the image data stored in the first volatile memory are output to the printer section based on control of the controller, and
wherein the controller executes software processing with assistance of programs stored in a memory of the controller to create a second management table for controlling image data reading from and writing to the second memory area and executes software processing with assistance of programs stored in the memory of the controller to create a job management table to link the image data being managed by the second management table and the image data stored in the first volatile memory with a job, the second management table comprising an image ID region for storing an image ID for identifying the image data, a start cluster region for storing a start cluster number of a continuous region in which the image data is stored, and an end cluster region for storing an end cluster number of the continuous region.

2. The computer system of claim 1, wherein the first management table comprises a file allocation table of the first memory area.

3. The computer system of claim 1, wherein the nonvolatile memory has a memory medium with the first memory area and the second memory area which is farther from a rotation center of the memory medium than the first memory area.

4. The computer system of claim 1, wherein a priority is given to the data reading and data writing of the second memory area over the data reading and data writing of the first memory area.

5. The computer system of claim 1, wherein a time period required for printing the image data by the printer section is longer than a time-period required for reading the image data from the second memory area.

6. The computer system of claim 1, wherein the controller writes a set of data to the first memory area in accordance with the first management table, and the controller writes a set of data to a continuous area of the second memory area.

7. A computer system comprising:
a volatile memory configured for storing image data;
a nonvolatile memory virtually divided into a plurality of areas including a first memory area configured for storing reusable image data and a second memory area configured as an extension of the volatile memory for temporarily storing image data, the first memory area having a file management table;
a controller configured for writing image data to the volatile memory and the nonvolatile memory, the controller executing software processing with assistance of programs stored in a memory of the controller to create a second management table for controlling reading data from and writing data to the second memory area and executing software processing with assistance of programs stored in the memory of the controller to create a job management table to link a job with the image data being managed by the second management table; and
a printer section configured for printing image data of a plurality of documents on recording media,
wherein the controller writes the image data to the first memory area in accordance with the file management table when the image data is to be reusably stored in the nonvolatile memory, and the controller writes the data to the second memory area of the nonvolatile memory in accordance with a management table stored in the volatile memory when the image data is to be temporarily stored in the second memory area of the nonvolatile memory thereby using the second memory area as an extension of the volatile memory, and
wherein the second management table comprises an image ID region for storing an image ID for identifying the image data, a start cluster region for storing a start cluster number of a continuous region in which the image data is stored, and an end cluster region for storing an end cluster number of the continuous region.

8. The computer system of claim 7, further comprising:
a scanner section for generating image data of a plurality of documents.

9. The computer system of claim 8 wherein, a time period required for generating the image data by the scanner section is longer than a time period required for writing the image data to the second memory area.

10. The computer system of claim 7, wherein a time period required for printing the image data by the printer section is a longer than a time period required for reading the image data from the second memory area.

11. A computer system comprising:
a first volatile memory configured for storing image data;
a nonvolatile memory which is virtually divided into a plurality of areas including a first memory area configured for storing reusable image data and a second memory area configured as an extension of the first volatile memory for temporarily storing image data, the first memory area including a first management table thereof;
a controller configured for controlling data reading from and data writing to the first volatile memory and the nonvolatile memory;
a scanner section configured for generating image data of a plurality of documents,
wherein the controller executes software processing with assistance of programs stored in a memory of the controller to create a second management table for controlling data writing of image data generated in the scanner section to the second memory area and executes software processing with assistance of programs stored in the memory of the controller to create a job management table to link the image data being managed by the second management table with a job, and
wherein the second management table comprises an image ID region for storing an image ID for identifying the image data, a start cluster region for storing a start cluster number of a continuous region in which the image data is stored, and an end cluster region for storing an end cluster number of the continuous region.

12. The computer system of claim 11, wherein a time period required for generating the image data by the scanner section is longer than a time period required for writing the image data to the second memory.

* * * * *